R. LA FRANCE.
BOTTLE HANDLING MECHANISM.
APPLICATION FILED JAN. 19, 1918.
1,355,232.
Patented Oct. 12, 1920.
3 SHEETS—SHEET 1.
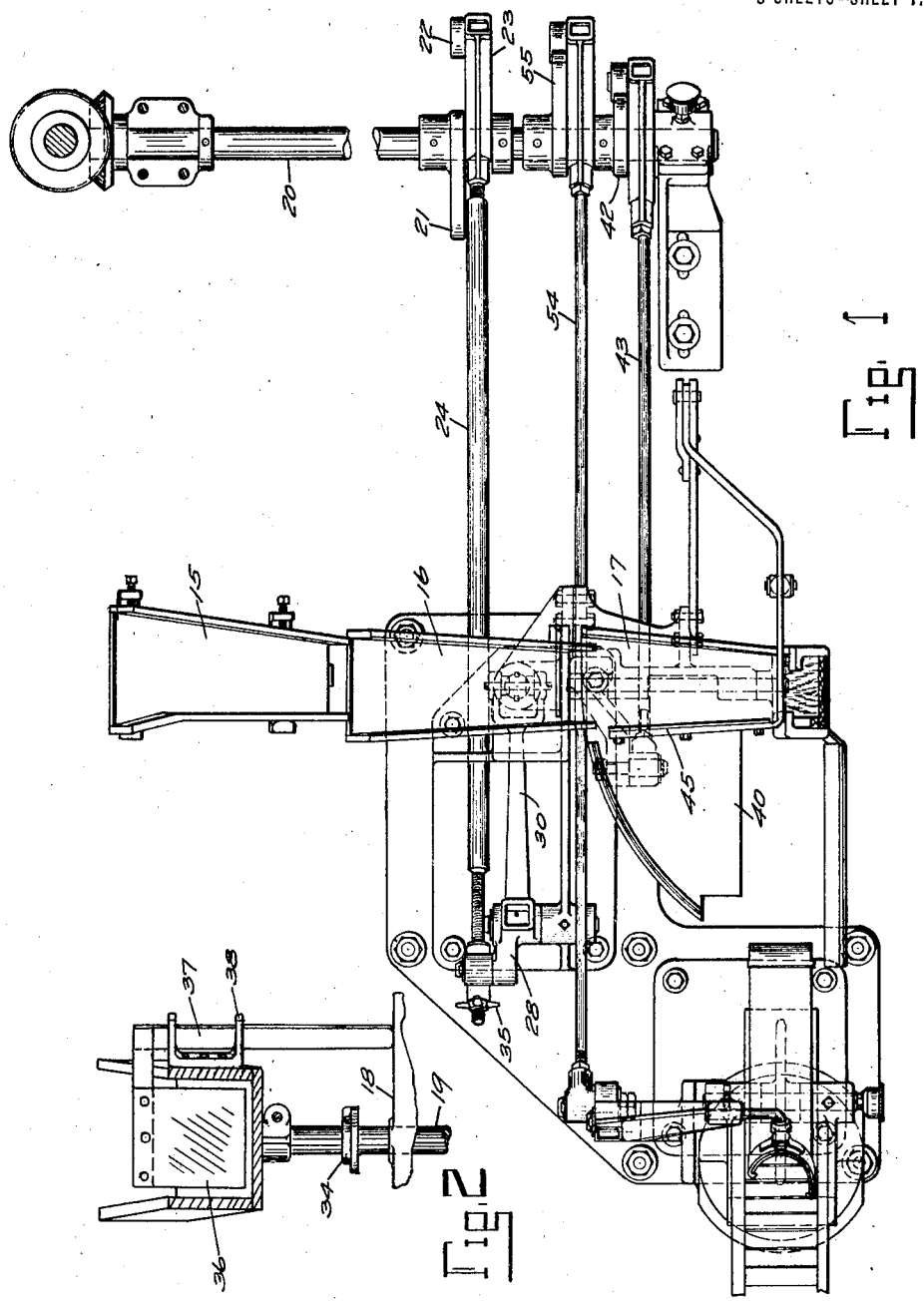
INVENTOR
Richard La France
By J. F. Rule,
Attorney.

R. LA FRANCE.
BOTTLE HANDLING MECHANISM.
APPLICATION FILED JAN. 19, 1918.
1,355,232.
Patented Oct. 12, 1920.
3 SHEETS—SHEET 2.
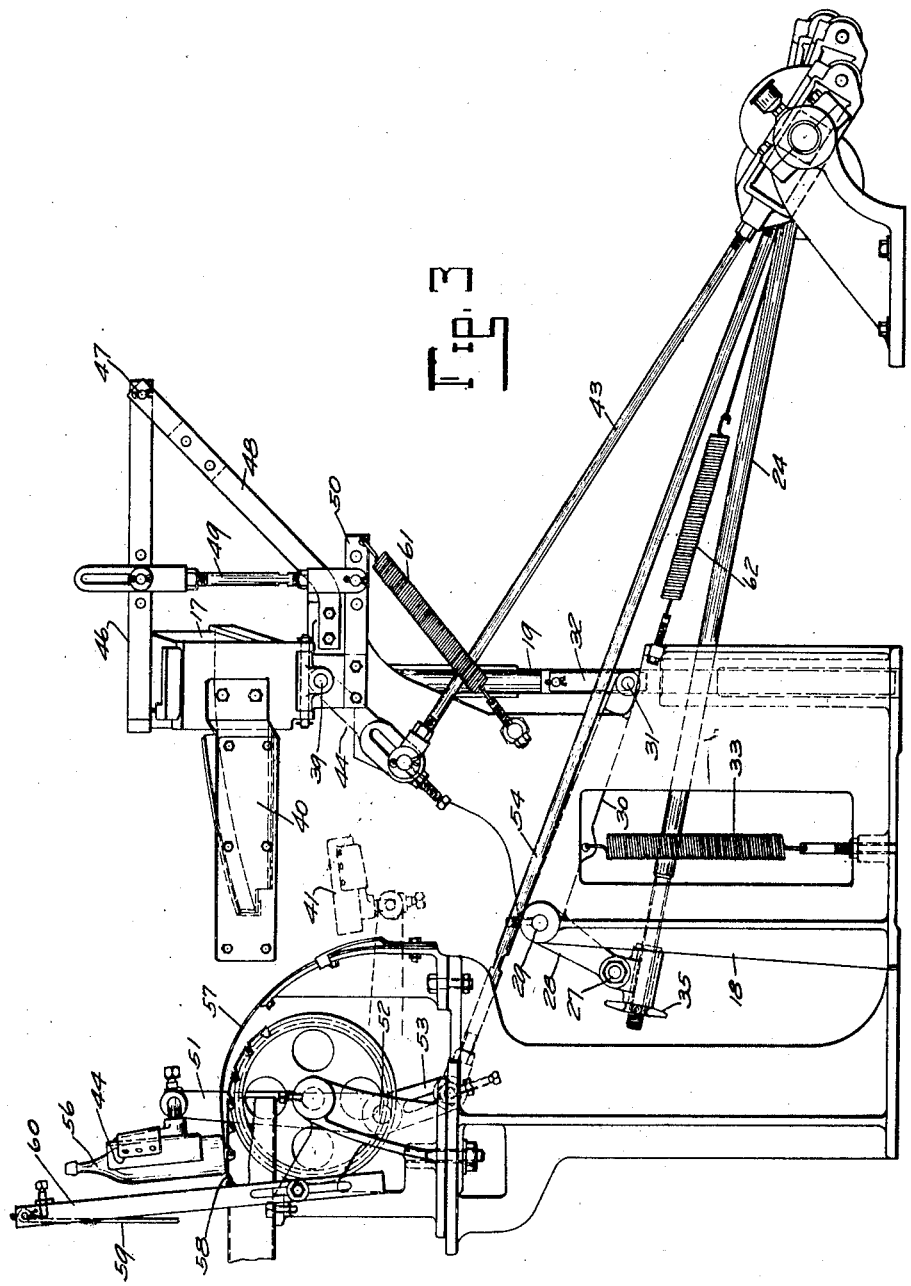
INVENTOR
Richard La France,
By J. F. Rule
Attorney.

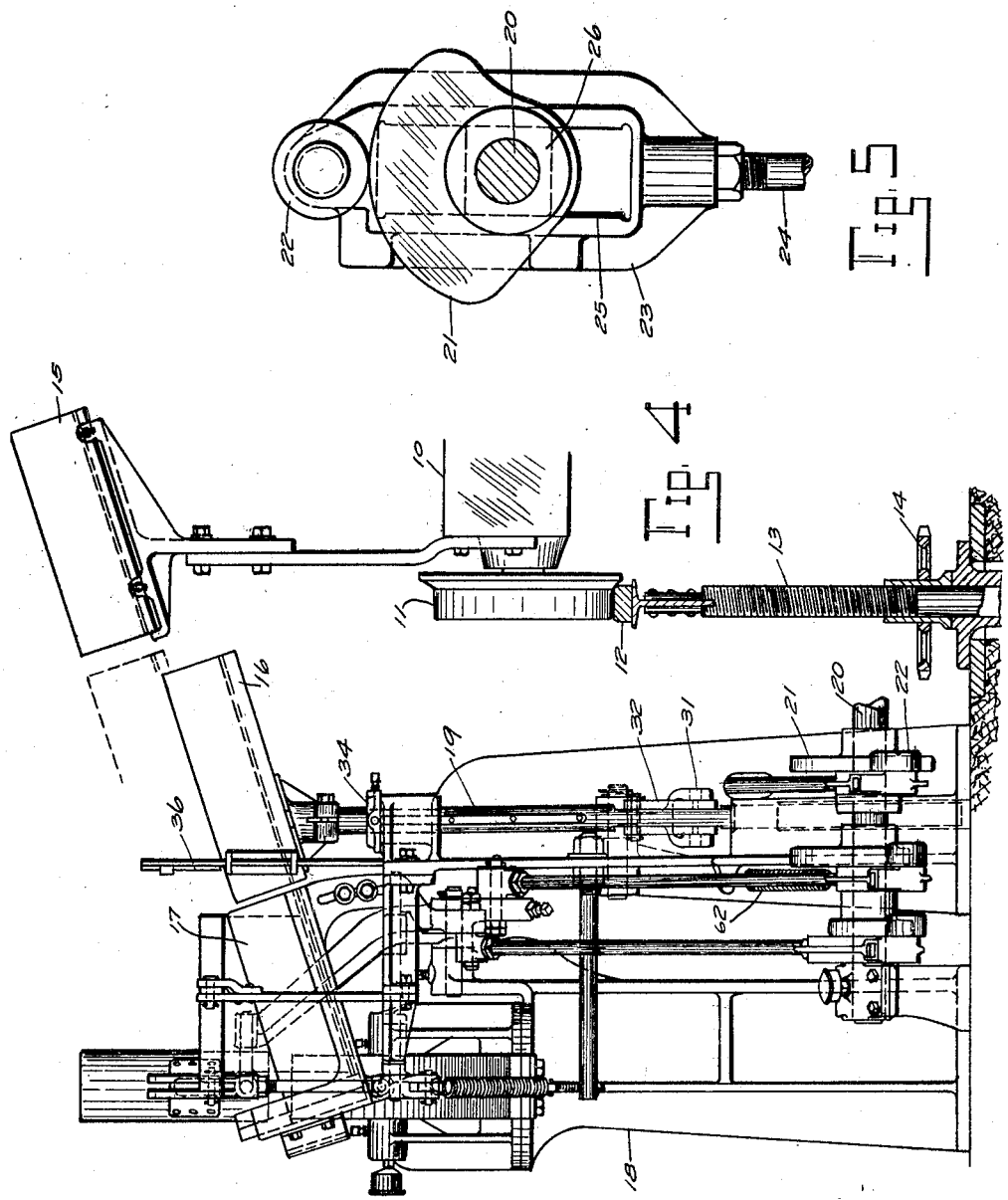

UNITED STATES PATENT OFFICE.

RICHARD LA FRANCE, OF TOLEDO, OHIO, ASSIGNOR TO THE OWENS BOTTLING MACHINE COMPANY, OF TOLEDO, OHIO, A CORPORATION OF OHIO.

BOTTLE-HANDLING MECHANISM.

1,355,232. Specification of Letters Patent. Patented Oct. 12, 1920.

Application filed January 19, 1918. Serial No. 212,614.

*To all whom it may concern:*

Be it known that I, RICHARD LA FRANCE, a citizen of the United States, residing at Toledo, in the county of Lucas and State of Ohio, have invented new and useful Improvements in Bottle-Handling Mechanism, of which the following is a specification.

My invention relates to conveying apparatus for receiving bottles or other articles one by one and transferring them from one point to another. As herein illustrated the invention is particularly designed for receiving glass articles as they are delivered from a forming or blowing machine and transferring them to a suitable position as, for example, to a conveyer by which they are carried to the annealing oven or leer.

Some glass forming machines are adapted to deliver the bottles or other articles at different heights, depending on the size of bottle being made, or other conditions. An object of the present invention is to provide suitable means for receiving such articles at different heights and transferring them to the setting-up or conveying mechanism, to which they are uniformly delivered at a constant elevation.

In its preferred form the apparatus comprises means forming an inclined passageway along which the articles are conveyed, including an upper section adjustable up and down with the glass forming machine, a lower section and an intermediate section, the latter movable up and down periodically to bring it in register with the upper section each time an article is discharged from the machine and then movable downward with the article thereon into register with the lower section, permitting the said article to be moved onto the lower section. Suitable means are provided for operating the intermediate section in synchronism with the discharge of the articles thereto. Means are also provided for adjusting the extent of up and down movement of the intermediate section to correspond with the adjustment of the upper section.

Other features and advantages of the invention will appear hereinafter.

In the accompanying drawings, Figure 1 is a plan view of an apparatus embodying the principles of my invention.

Fig. 2 is a detail elevation showing a stop for preventing premature discharge of the articles from the intermediate trough section.

Fig. 3 is an elevation of the apparatus shown in Fig. 1.

Fig. 4 is an elevation of the mechanism as viewed at right angles to Fig. 3.

Fig. 5 is a detail showing one of the operating cams.

The apparatus as herein shown is adapted to receive bottles or other articles from a glass forming machine and set them in upright position on a conveyer, by which they are carried to the leer. The glass forming machine is provided with a base or truck 10 (Fig. 4) having wheels 11 to run on tracks 12 whereby the machine can be moved toward and from a furnace supplying the molten glass. The machine is adjustable vertically to bring the molds to the proper height relative to the glass flowing apparatus, this height depending on the size of the bottle being blown, or other conditions. To permit such adjustment the rails 12 may be mounted on standards 13 screw-threaded for up and down movement through the threaded hubs of wheels 14. Said wheels are rotatable to vertically adjust the standards 13 and the machine mounted thereon.

The bottles or other articles are discharged from the machine onto an inclined chute 15 mounted on the machine. This chute forms one section of an inclined passageway or trough, which also comprises an intermediate section 16 and a lower section 17. The trough 16 is moved up and down periodically to bring it into register with the chute 15 each time a bottle is discharged onto the latter. The trough 16 with the bottle thereon then moves downward into register with the lower section or pan 17, which then receives the bottle.

The trough sections 16 and 17 are mounted in a framework 18. The trough 16 is carried by a vertical shaft 19 slidable up and down in the frame 18. The means for moving the trough 16 up and down comprises a drive shaft 20 connected through suitable gearing to the mechanism which operates the glass forming machine so that said drive shaft is driven in synchronism with the machine. That is to say, the drive shaft is given one complete rotation for each bottle discharged from the machine. Secured to the drive shaft is a cam 21 for actuating the trough 16. The cam 21 as it rotates strikes a cam roll 22 carried by a head 23 on a rod 24 and thereby moves said rod lengthwise. Said head is formed with a guideway 25 to receive a squared bearing block 26 on the shaft, whereby the rod is guided. The opposite end of the rod 24 has a pivotal connection 27 with an arm 28 of a bell-crank pivoted at 29 on the frame 18. The other arm 30 of the bell-crank is formed at its outer end with a yoke pivoted at 31 to the lower ends of links 32, the latter being pivoted at their upper ends to the stem 19. A spring 33 connected at one end to the arm 30 and anchored at its other end in the frame 18, holds the roll 22 against the cam, insuring the reciprocation of the rod 24 as the cam shaft 20 rotates. This motion is transmitted through the bell-crank to the stem 19, thereby causing the trough 16 to move up and down. A collar 34 on the stem 19 limits the downward movement of the trough by striking the frame 18 so that said trough is always brought to rest in alinement with the lower section 17.

The distance through which the trough moves vertically may be regulated by adjusting the effective length of the rod 24. This adjustment may be made by a hand wheel or nut 35 on the threaded end of the rod. The cam 21 is so adjusted that when a bottle or the like moves down the chute 15 the trough 16 is in its uppermost position, (indicated by dotted lines, Fig. 4) in register with said chute, permitting the bottle to slide down the chute until arrested by a stop 36 (Fig. 2) at the lower end of the trough. Said stop is carried by a vertical stem 37 guided in a bracket 38 on the trough. As the trough moves downward the stem 37 strikes the frame 18 and arrests the stop while the trough continues its downward movement. By the time the trough is in register with the pan 17 the clearance between the stop and trough permits the bottle to slide onto the pan.

The lower section or pan 17 is mounted by a pivot 39 for lateral tilting movement to permit the bottle which has been placed neck downward thereon, to roll sidewise onto an extension or platform 40 and off said platform onto a cradle 41. As the bottle rolls over the platform 40 it is swung through an angle of substantially 90 degrees so as to lie lengthwise of the cradle 41. The tilting of the pan is effected by a cam 42 operating through a rod 43. The latter is connected to an arm 44 fixed to the tilting section 17. In order to prevent the bottle from rolling onto the extension 40 prematurely a shield 45 is provided. This shield is lifted as the pan tilts and for this purpose is connected to an arm 46 pivoted at 47 to a stationary bracket 48. The arm 46 is connected through a link 49 to a bracket 50 on the pan so that as the latter tilts the link operates through the arm 46 to lift the shield.

The cradle 41 is carried by a lever 51 pivoted at 52 and having an arm 53 connected to a rod 54 actuated by a cam 55 on the shaft 20. This cam operates to swing the cradle from the dotted line position (Fig. 3) upward to the full line position. The bottle 56 supported on the cradle is thus moved along the guide 57 and set up in a position to be carried by an endless conveyer 58 to the leer. A guard 59 may be provided to prevent the bottles tilting forward as they are set up on the conveyer. This guard is pivoted on a supporting bar 60 to swing upward and permit the bottles to pass. The supporting bar is mounted for both vertical and angular adjustment to bring the guard to any desired position. A spring 61 may be provided to return the pan section 17 after it has been tilted and to hold the rod 43 in operative relation to its cam 42. A spring 62 may operate on the rod 54 for a like purpose.

Variations may be resorted to without departing from the spirit or scope of my invention, and portions may be used without others.

What I claim is:—

1. In apparatus for handling bottles delivered thereto *seriatim* at equal intervals, means forming an inclined passageway comprising upper, lower and intermediate sections, positively operated means controlled independently of the weight of the bottles and operating periodically at intervals equal to said first mentioned intervals, to reciprocate the intermediate section up and down and thereby bring it alternately into register with the upper and lower sections, a stop reciprocating with said intermediate section and positioned to prevent a premature discharge of the bottles therefrom, and means whereby said stop is automatically arrested during the downward movement of the intermediate section and thereby rendered ineffective as the intermediate and lower sections are brought into register.

2. In apparatus for handling articles delivered thereto *seriatim*, means forming an inclined passageway and comprising upper, lower and intermediate sections, means controlled independently of the weight of said articles to reciprocate the intermediate section up and down while the upper and lower sections remains stationary to bring it alternately into register with the upper and lower sections, said upper section being adjustable to different heights, and means to adjust the amplitude of movement of the intermediate section to correspond to the adjustment of said upper section.

3. In apparatus for handling articles delivered thereto *seriatim* at predetermined intervals, means forming an inclined passageway comprising upper, lower and intermediate sections, means controlled independently of the weight of said articles and operating at intervals equal to said first mentioned intervals to reciprocate the intermediate section up and down while the upper and lower sections remain stationary to bring it alternately into register with the upper and lower sections, means to adjust the relative height of the upper and lower sections, and means to vary the extent of movement of the middle section to correspond with said adjustment.

4. The combination with apparatus to receive bottles in a cumbent position and set them in an upright position, of a chute or trough from which the bottles are discharged onto said setting-up apparatus, and automatic mechanism controlled independently of the bottles and operating in synchronism with the setting-up apparatus to move said chute bodily in a vertical direction into position to receive a bottle and then in the opposite direction into position to discharge the bottle onto the setting-up apparatus.

5. The combination with apparatus to receive bottles in a cumbent position and set them in an upright position, of a chute or trough from which the bottles are discharged onto said setting-up apparatus, automatic mechanism controlled independently of the bottles and operating in synchronism with the setting-up apparatus to move said chute bodily in a vertical direction into position to receive a bottle and then in the opposite direction into position to discharge the bottle onto the setting-up apparatus, a stop device to prevent premature discharge of the bottle from said chute, and means whereby the stop device is moved out of stop position as the chute is brought into discharging position.

6. In apparatus for handling articles *seriatim*, the combination of a transfer device to which the articles are delivered, a receiver to which the articles are delivered from the transfer device, and automatic means operated and controlled independently of said articles for moving said transfer device bodily up and down vertically into receiving and delivering positions respectively, said means comprising a cam shaft, a cam thereon, a rod actuated by said cam, and a bell-crank by which motion is transmitted from said rod to said transfer device.

7. The combination of a downwardly inclined chute to receive bottles or other articles *seriatim*, a second inclined chute to receive the articles from the first chute, setting-up mechanism to receive the articles from said second chute and place them in upright position, said second chute being located between the first chute and said mechanism and movable vertically downward from a position in register with the first chute into register with the setting-up mechanism, positive means operating in synchronism with the delivery of the articles to the chutes to cause said vertical movements, said means comprising a cam, connections between the cam and said second chute for positively lifting the latter, said first chute being adjustable vertically, means for adjusting said connections to regulate the position to which the second chute is lifted by the cam so that it will register with the first chute, and a stop to positively limit the downward movement of the second chute at a position in register with said receiving mechanism.

8. The combination of a downwardly inclined chute to receive bottles or other articles *seriatim*, a second inclined chute to receive the articles from the first chute, setting-up mechanism to receive the articles from said second chute and place them in upright position, said second chute being located between the first chute and said mechanism and movable vertically downward from a position in register with the first chute into register with the setting-up mechanism, positive means operating in synchronism with the delivery of the articles to the chutes to cause said vertical movements, said means comprising a cam, connections between the cam and said second chute for positively lifting the latter, said first chute being adjustable vertically, means for adjusting said connections to regulate the position to which the second chute is lifted by the cam so that it will register with the first chute, a stop to positively limit the downward movement of the second chute at a position in register with said receiving mechanism, a gate at the lower end of said second chute forming a stop for the articles when said chute is in register with the setting-up mechanism, said gate being mounted to move up and down with said second chute, and means forming a stop for the gate as said chute moves downward whereby the gate is automatically lifted relatively to the chute to permit the passage of the articles when said chute reaches its lowered position.

Signed at Toledo, in the county of Lucas and State of Ohio, this 15 day of January, 1918.

RICHARD LA FRANCE.